(12) United States Patent
Ballerini

(10) Patent No.: US 11,745,875 B2
(45) Date of Patent: Sep. 5, 2023

(54) BASE OF STATIONING AND AUTOMATIC MANAGEMENT FOR DRONES

(71) Applicants: DRONUS S.p.A., Rome (IT); Marco Ballerini, Trieste (IT)

(72) Inventor: Marco Ballerini, Trieste (IT)

(73) Assignee: DRONUS S.P.A., Rome (IT)

( * ) Notice: Subject to any disclaimer, the term of this patent is extended or adjusted under 35 U.S.C. 154(b) by 466 days.

(21) Appl. No.: 17/054,458

(22) PCT Filed: May 9, 2019

(86) PCT No.: PCT/IB2019/053817
§ 371 (c)(1),
(2) Date: Nov. 10, 2020

(87) PCT Pub. No.: WO2019/215658
PCT Pub. Date: Nov. 14, 2019

(65) Prior Publication Data
US 2021/0229807 A1 Jul. 29, 2021

(30) Foreign Application Priority Data
May 10, 2018 (IT) .......... 102018000005252

(51) Int. Cl.
*B64C 39/02* (2023.01)
*B64F 1/02* (2006.01)
*B64D 45/04* (2006.01)
*B64F 1/20* (2006.01)
*B64U 30/20* (2023.01)
*B64U 70/30* (2023.01)

(52) U.S. Cl.
CPC ............ *B64C 39/024* (2013.01); *B64D 45/04* (2013.01); *B64F 1/02* (2013.01); *B64F 1/20* (2013.01); *B64U 30/20* (2023.01); *B64U 70/30* (2023.01)

(58) Field of Classification Search
CPC ......... B64C 39/024; B64D 45/04; B64F 1/02; B64F 1/20; B64F 1/222; B64F 1/125; B64U 30/20; B64U 70/30; B64U 10/13; B64U 10/10; B64U 50/13; B64U 70/00; B64U 80/00
See application file for complete search history.

(56) References Cited

U.S. PATENT DOCUMENTS

| | | | | |
|---|---|---|---|---|
| 4,123,020 A | * | 10/1978 | Korsak | ............... B64F 1/125 244/116 |
| 5,799,900 A | * | 9/1998 | McDonnell | ............... B64F 1/02 244/17.11 |
| 7,538,688 B1 | * | 5/2009 | Stewart | ............... E01F 13/028 340/541 |

(Continued)

FOREIGN PATENT DOCUMENTS

| | | |
|---|---|---|
| EP | 2974958 A2 | 1/2016 |
| WO | 2015/195202 A2 | 12/2015 |
| WO | 2017/101589 A2 | 6/2017 |

OTHER PUBLICATIONS

International Search Report and Written Opinion for PCT/IB2019/053817, dated Sep. 16, 2019.

*Primary Examiner* — Medhat Badawi
(74) *Attorney, Agent, or Firm* — ArentFox Schiff LLP

(57) ABSTRACT

The present invention relates to the field of the unmanned aerial vehicles, in particular to a suspended landing and take-off and management base.

16 Claims, 2 Drawing Sheets

(56) References Cited

U.S. PATENT DOCUMENTS

| | | | |
|---|---|---|---|
| 7,954,758 B2 * | 6/2011 | McGeer | B64C 39/024 244/110 G |
| 8,162,256 B2 * | 4/2012 | Goossen | B64F 1/04 244/114 R |
| 8,172,177 B2 * | 5/2012 | Lovell | B63B 27/10 244/110 F |
| 8,439,301 B1 * | 5/2013 | Lussier | B64C 39/024 89/1.813 |
| 8,453,966 B2 * | 6/2013 | McGeer | B64F 5/40 244/110 F |
| 8,511,606 B1 * | 8/2013 | Lutke | B64C 39/024 320/109 |
| 8,573,536 B2 * | 11/2013 | McGeer | B64F 5/00 244/114 R |
| 8,857,754 B2 * | 10/2014 | Ferrari | B64D 1/22 244/2 |
| 8,955,800 B2 * | 2/2015 | McGeer | B64C 39/024 244/116 |
| 9,139,310 B1 * | 9/2015 | Wang | B64F 1/007 |
| 9,174,747 B2 * | 11/2015 | Kang | B64F 1/18 |
| 9,527,605 B1 * | 12/2016 | Gentry | B65G 51/02 |
| 9,529,359 B1 * | 12/2016 | Annan | B64D 27/24 |
| 9,573,684 B2 * | 2/2017 | Kimchi | G05D 1/0088 |
| 9,862,285 B2 * | 1/2018 | Lee | B64F 1/005 |
| 9,902,504 B2 * | 2/2018 | Moore | B64C 39/024 |
| 9,937,808 B2 * | 4/2018 | Evans | B64C 27/10 |
| 9,975,442 B2 * | 5/2018 | Lee | B64C 39/024 |
| 10,112,728 B2 * | 10/2018 | Evans | G05D 1/0027 |
| 10,336,543 B1 * | 7/2019 | Sills | G05D 1/0094 |
| 10,399,702 B2 * | 9/2019 | McGeer | B64C 39/024 |
| 10,407,182 B1 * | 9/2019 | Alcorn | B64U 10/30 |
| 10,532,815 B1 * | 1/2020 | Thrun | B64F 1/362 |
| 11,027,844 B2 * | 6/2021 | von Flotow | B64U 50/13 |
| 11,065,976 B2 * | 7/2021 | Venturelli | B60L 53/50 |
| 11,204,612 B2 * | 12/2021 | von Flotow | G05D 1/104 |
| 11,338,911 B2 * | 5/2022 | Wong | B64D 5/00 |
| 11,524,797 B2 * | 12/2022 | von Flotow | B64C 39/024 |
| 2002/0093564 A1 * | 7/2002 | Israel | H04N 7/106 348/E7.086 |
| 2006/0249622 A1 * | 11/2006 | Steele | B64F 1/02 244/115 |
| 2008/0156932 A1 * | 7/2008 | McGeer | B64F 1/029 244/110 F |
| 2009/0314883 A1 * | 12/2009 | Ariton | F41A 9/13 244/63 |
| 2011/0150565 A1 * | 6/2011 | Sapir | B64F 1/06 403/344 |
| 2011/0300738 A1 * | 12/2011 | Hengel | H01R 13/44 439/374 |
| 2012/0151851 A1 * | 6/2012 | Cantin | E04H 1/1205 52/79.5 |
| 2012/0292430 A1 * | 11/2012 | Ferrari | B64F 1/0295 244/2 |
| 2016/0009413 A1 * | 1/2016 | Lee | G08G 5/025 701/16 |
| 2016/0200207 A1 * | 7/2016 | Lee | B64C 25/32 244/17.23 |
| 2016/0244187 A1 * | 8/2016 | Byers | B64F 1/04 |
| 2016/0347192 A1 * | 12/2016 | Lee | B64C 39/024 |
| 2017/0182901 A1 * | 6/2017 | Lee | B60L 53/30 |
| 2018/0244389 A1 * | 8/2018 | Herlocker | B66C 1/42 |
| 2019/0043371 A1 * | 2/2019 | Evan | G08G 5/0069 |
| 2019/0389576 A1 * | 12/2019 | White, III | B64D 1/02 |
| 2020/0047353 A1 * | 2/2020 | Zheng | B25J 15/10 |
| 2020/0290752 A1 * | 9/2020 | Kolosiuk | B64D 39/06 |
| 2020/0290753 A1 * | 9/2020 | Anastassacos | B64F 1/32 |
| 2020/0406773 A1 * | 12/2020 | Lacaze | B64C 39/022 |
| 2021/0070470 A1 * | 3/2021 | Werner | B64D 9/00 |
| 2021/0229807 A1 * | 7/2021 | Ballerini | B64U 10/13 |
| 2021/0309388 A1 * | 10/2021 | Ratajczak | B60L 53/14 |

* cited by examiner

BASE OF STATIONING AND AUTOMATIC MANAGEMENT FOR DRONES

CROSS-REFERENCE TO RELATED APPLICATIONS

The present disclosure is a national stage application of International patent Application No. PCT/IB2019/053817, which was filed on May 9, 2019 and claims the priority of Italian Patent Application No. 102018000005252, filed on May 10, 2018 and entitled "BASE OF STATIONING AND AUTOMATIC MANAGEMENT FOR DRONES", and the disclosure content of which is hereby incorporated by reference into the present application.

FIELD OF APPLICATION

The present invention relates to the field of the unmanned aerial vehicles.

The present invention, more in particular, relates to a stationing base for the landing and take-off and the automatic management of unmanned aerial vehicles.

BACKGROUND

In the reference technical field, the landing and take-off manoeuvres of the so-called unmanned aerial vehicles, commonly known as drones, in particular of the type providing a propeller drive, can provide the use of a stationing base.

Said bases fulfil the function of dedicated landing point for the aerial vehicle and therethrough it is possible for example to re-acquire manual access to perform activities such as maintenance, setting, replacement of components and other analogous activities.

By taking as reference plane a plane detected by said base, as it is known the drone trajectory (VTOL in vertical take-off) to perform landing provides to reach and rest on the base with a motion from the top to the bottom with respect to said reference plane and, vice versa, the take-off trajectory involves a motion from the bottom to the top so that, thanks to the propulsive thrust of helixes, the drone raises indeed from the base itself.

With particular reference to the field of model airplanes, the above-mentioned bases have generally small sizes and automated landing manoeuvres, having huge difficulties for the precision of the motions required for centring the base and complications due to the presence of air flows induced by the drone or by the wind, for example due to the vortexes generated on the base by the helixes themselves of the drone, they involve manoeuvres with a considerable percentage of failures, that is the missed approach to the base.

For example, by considering a descending manoeuvre, that is during the phase for landing on the base, the lift reduces and increases, vice versa, the angle of attack of the profile of helix blade(s), in this way by bringing the drone close to the condition of aerodynamic stall and, then, of more instable flight with respect to the landing or raising phase. This phenomenon, or in presence of wind, can involve namely a greater percentage of errors in the landing phase, by imposing very big sizes of bases to complete the manoeuvre successfully apart from the difficulty of centring the drone with respect to the base considering the hooking and the change/replacement procedures of payload and batteries.

EP 2974958 discloses an apparatus provided with a spherical case for containing and reloading an unmanned aerial vehicle.

US 2012/292430 discloses a system comprising an unmanned vehicle and a base for launching and recovering the same, wherein the base comprises a docking station and is provided with spaced-apart deformable tubes as guide means for guiding the unmanned vehicle through the base.

WO 2015/195202 discloses a stationing base with a half spherical body and magnetic retaining means for holding and launching an unmanned aerial vehicle.

BRIEF DESCRIPTION OF THE INVENTION

The object of the present invention is then to overcome the above-illustrated problems, and this is obtained through a landing and take-off base as defined in claim 1.

In particular, the object of the present invention is to show a landing and take-off base for an unmanned aerial vehicle, advantageously and further configured for covering/protecting the latter, which is structurally simple, effective for the success of "landings" and fastening and for improving the manoeuvrability of aerial vehicles during the take-off phase and above all the phase of landing on static/fix stations.

Additional features of the present invention are defined in the corresponding depending claims.

The present invention relates to a suspended landing and take-off base for an unmanned aerial vehicle. The base comprises a main body provided with a continuous internal wall and an opening defining a stationing region for the aerial vehicle inside the main body. The base further comprises retaining means provided with a couple of gripping arms configured to engage an attachment portion of the aerial vehicle, by allowing a controlled hooking and/or release of the latter. More in detail, the continuous inner wall has a converging truncated conical shape towards the retaining means and the opening is placed at the larger base surface. The overall configuration of the base is so that, under assembled condition, the retaining means can assume a gripping condition wherein the aerial vehicle is hooked and at least partially housed inside the stationing region, and a release condition wherein the aerial vehicle is released and free to fall through the opening of the main body during the take-off.

Such solution allows to reverse the conventional landing trajectory, that is a trajectory wherein the aerial vehicle raises towards the base, in raised position with respect to a reference plane, and it engages on the base through a retention mechanism. In this way considerable advantages are obtained in relation to the reliability of the "landings" as the aerial vehicle, in particular the helix blades of its propellers, during raising, have an angle of attack which progressively decreases, by decreasing consequently the risk that the aerial vehicle is in a condition of aerodynamic stall, by improving then stability and control thereof.

Still, the above-mentioned configuration of the base reduces the negative effects of the air flow generated by the helixes' blades of the aerial vehicle on the base, as said flow does not interfere with the latter. In this way a better stability and then precision in moving the aerial vehicle for centring the base is obtained.

According to an additional advantageous aspect, the invention allows a guide and centring of the drone in the base performed mechanically between the base shape and an attachment portion of the aerial vehicle. In fact, the forces generated during the contact between said attachment portion and the internal wall of the base induce the aerial vehicle to a motion directed towards the preferably substantially conical or truncated conical-shaped central region of the base, by providing in particular a self-stabilizing motion in the landing phase during raising. The stability of the motion dynamics is guaranteed specifically by the contact of the attachment portion of the aerial vehicle—preferably implemented as a portion projecting from its frame body—with the internal wall of the base. In this way further and different components of the aerial vehicle, such as for example, the helixes or possible projections of the same, are prevented from coming in contact with the base, by obtaining the opposed effect of inducing the aerial vehicle to a motion directed towards outside the base.

Among the several advantages which such solution offers, there is even the possibility of implementing bases with more limited sizes than the traditional ones and at the same time guaranteeing a greater effectiveness in centring the same.

Other advantages, together with the features and use modes of the present invention, will result evident from the following detailed description of preferred embodiments thereof, shown by way of example and not for limitative purposes.

BRIEF DESCRIPTION OF THE FIGURES

The drawings shown in the enclosed figures will be referred to, wherein.

DETAILED DESCRIPTION OF EMBODIMENTS OF THE INVENTION

The present invention will be described hereinafter with reference to the above-mentioned figures.

Figure 1:
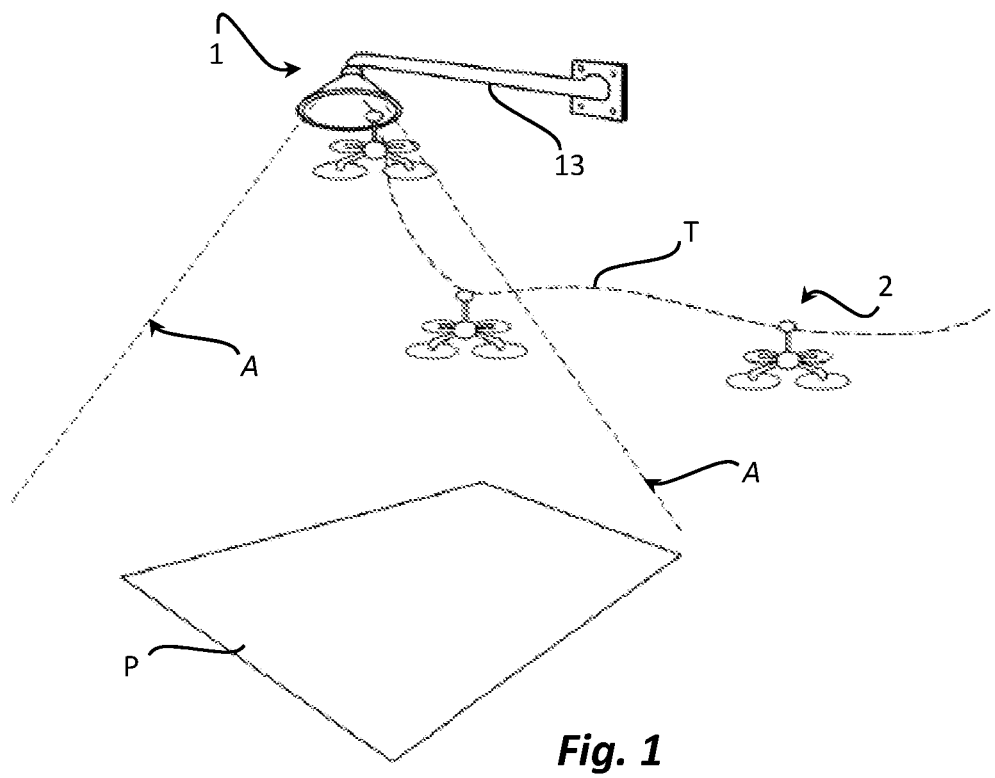
FIG. 1 shows an overall view in use and assembled condition of a take-off and landing base for an unmanned aerial vehicle according to a preferred embodiment.

By firstly referring to FIG. 1, a landing and take-off base 1 for an unmanned aerial vehicle 2 according to a preferred embodiment of the present invention is shown in assembled—and in use—condition. Said base results to be further configured like a centring base for the aerial vehicle, that is capable of allowing a correct approaching and centring in the landing and take-off phases as it will be illustrated in more details hereinafter.

Under the term "base" a device is meant to be identified, apt to cooperate with said aerial vehicle to allow a temporary or permanent stationing and/or covering of the latter, that is an element supporting the aerial vehicle.

The configuration of the base 1 is so that the stationing can then involve additional operating conditions of or on the aerial vehicle 2 to the phase of its landing and take-off from the base 1, such as for example the replacement and/or recharge of the batteries, the change of sensor defined as "payload" of the aerial vehicle itself, thereabout one will discuss hereinafter.

Still taking into consideration the context of the present invention, the expression "unmanned aerial vehicle" is equivalent to the term drone and to all types of vehicles attributable thereto, thereamong the model airplanes. The present invention can be namely applied in diversified fields and preferred use in contexts such as video surveillance, automatic inspection of plants and structures, safety of interest sites, entertainment or analogous contexts.

Moreover, although in the illustrated embodiments the type of represented aerial vehicle 2 is the helix-type one, and in particular with four rotors, the base 1 according to the present invention is suitable to be used with aerial vehicles the propulsion thereof is different from the helix one and however with aerial vehicles with single rotor or multi-rotor in general.

Figure 2:
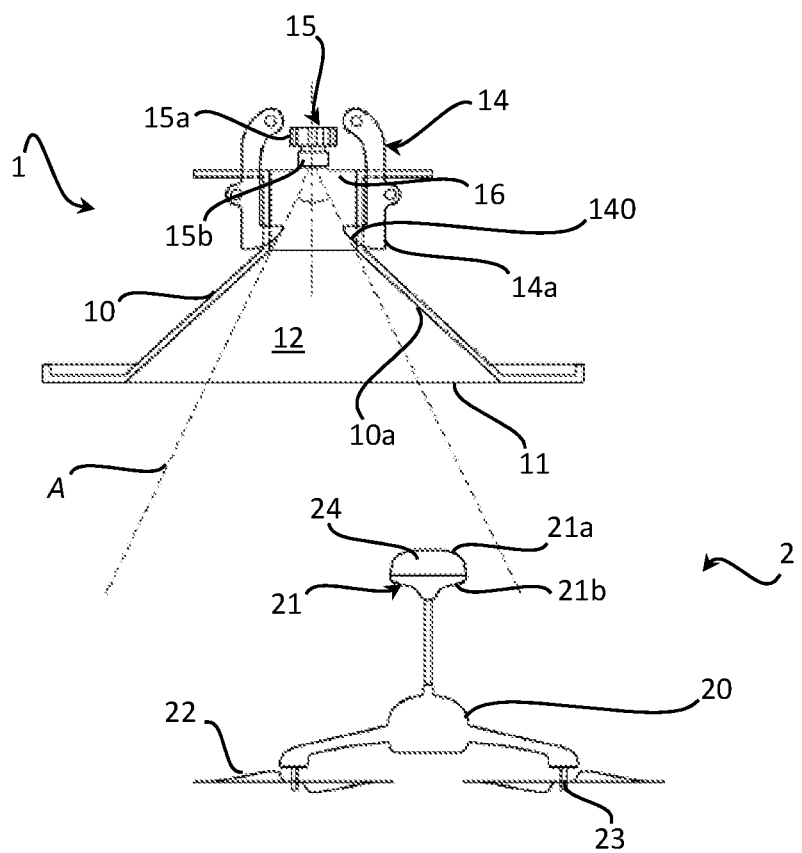
FIG. 2 shows a side section view of the base of FIG. 1 and of an aerial vehicle in a phase for approaching or moving away from the base.

As it can be seen in FIG. 2, the base comprises a main body 10 provided with a continuous internal wall 10a and an opening 11 defining inside the main body a stationing region 12 for the aerial vehicle 2.

In the illustrated embodiment, the base 1 preferably comprises supporting means 13 configured to fix said main body 10 to a wall or fixed structure in a suspended position with respect to a reference plane for the manoeuvring procedures of the aerial vehicle 2.

By taking then the reference plane to illustrate the operation dynamics of the base 1, such as for example the ground designated with the reference P in FIG. 1, under the term "landing" a particular manoeuvre is meant wherein the specific configuration of the base 1 allows the aerial vehicle 2, in terms of trajectory T, to approach and land thereon from the bottom to the top, that is moving away from the reference plane P. Vice versa, and with reference to FIG. 5, under the term "take-off" a particular manoeuvre is meant which allows a detachment and a controlled descent of the aerial vehicle 2 from the base 1 with a trajectory T from the top to the bottom, that is approaching to the reference plane (such as for example the ground, although in said FIG. 5 it is not illustrated).

As said, the providing of supporting means 13 allows advantageously the suspension of the base 1, for example through wall brackets as illustrated in FIG. 1. It is to be meant that the supporting means can be of different type (for example both static and moving that is vehicles, boats or vehicles) and that the reference plane P can be not the ground, that is footboards and the like, that is surfaces of bodies of water or sea surface. Moreover, the same main body 10 could be shaped so as to result as supporting structure for the suspension of the base 1 with respect to the reference plane P. In this last not illustrated case, such supporting structure for example could have a configuration of the pedestal type, with (even telescopic) elements resting upon a reference plane P and keep the base 1 in suspended position.

With reference to FIG. 2, the base 1 further comprises retaining means 14, configured to engage an attachment portion 21 of the aerial vehicle 2 and to allow a controlled hooking and/or release of the latter, in the example mechanical means, but which can be magnetic and/or pneumatic, however system allowing the fastening without the help of electric or controlled actuators.

Such attachment portion 21, advantageously, allows even the guide of the aerial vehicle 2 during raising (or landing phase) by allowing to direct the latter still towards a central region inside the base thanks to its contact with the continuous inner and, preferably smooth, wall 10a of the main body 10. Such aspect will be described with greater detail hereinafter.

Then, it appears evident that the configuration of the base 1 is so that, in use, said retaining means 14 can assume a gripping condition wherein the aerial vehicle 2 is hooked and at least partially housed inside the stationing region 12 and a release condition wherein the aerial vehicle 2 is released and free to move away from the base 1 through said opening 11 during the take-off.

It will be appreciated that the base 1 according to the present invention allows to reverse the direction of the conventional landing trajectory T, that is a trajectory wherein the aerial vehicle 2 raises towards the base 1 in raised position with respect to the reference plane P and engages on the base 1 through a retention mechanism. In this way considerable advantages are obtained in relation to the success of "landings" since the drone 2, preferably with reference to the helix blades, designated with the reference 22, of its motors, in the raising phase have an angle of attack which decreases, by consequently decreasing the risk that the drone 2 is in a condition of aerodynamic stall, thus by improving the stability and control thereof.

Moreover, the negative effects of the air flow generated by the blades of the helixes 22 on the base 1 are reduced drastically, since said flow results to be directed towards the reference plane P and it does not interfere with the base 1 suspended thereabove. In this way a better precision is obtained in moving the aerial vehicle 2 for centring the base 1, thus being able to implement bases with more limited sizes than the traditional ones.

Preferably, the main body 10 has a truncated conical or substantially truncated conical shape and the opening 11, therethrough the aerial vehicle 2 passes for housing or abandoning the stationing region 12, is at the larger base surface of the truncated cone. In more general terms, it can be said that preferably the shape of the main body 10 comprises at least a section with minimum diameter at a distal position from the opening 11.

Figure 3:
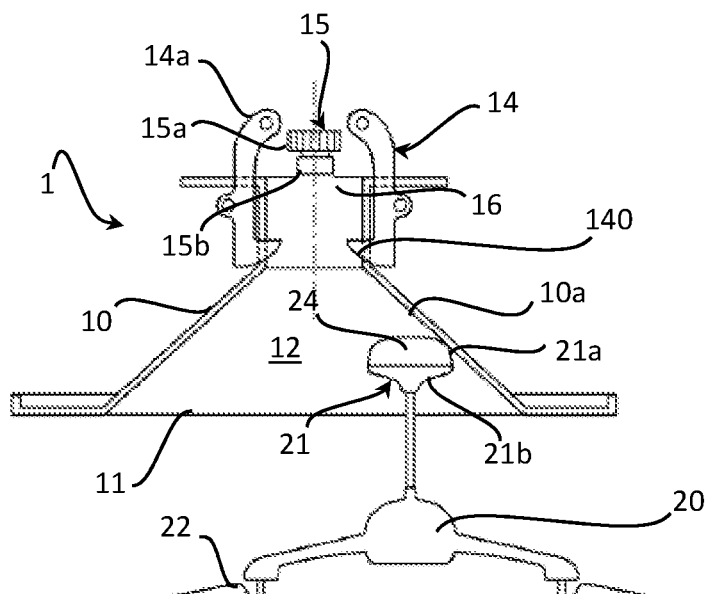
FIG. 3 shows a side section view of the base of FIG. 1 and of the aerial vehicle of FIG. 2 during an operating phase for centring the trajectory of the aerial vehicle.

As it can be seen in FIG. 3, in this way the inner walls 10*a* of the main body 10, converge preferably towards the retaining means 14 and fulfil a guiding and centring function for the aerial vehicle 2 through one apical element thereof 21*a* of the engagement portion 21, at least in a phase for landing on the base 1.

Such shape fulfils the function of mechanism of self-centring the position of the aerial vehicle, by guaranteeing precision landings without the need for arranging positioning auxiliary systems.

The inlet opening 11 of the aerial vehicle inside the main body of the base is sufficiently extended so as to allow starting the landing raise even with a centring error equal to the radius of opening 11 and wherein the inner walls 10*a* represent even a containing and covering surface of the aerial vehicle. That is, the internal wall fulfils both the function of guiding surface and the function of containing and covering surface as it is a continuous and, preferably, smooth wall.

In particular, it will be appreciated that the base 1 according to the present invention allows a self-centring landing trajectory T, that is a trajectory wherein the aerial vehicle 2 raises towards the base 1 even if in decentralized position with respect to the fastening system by reaching the retaining means 14, if required forcedly, for example by skimming on the internal wall 10*a*, to engage with the latter which are placed, preferably, in centred position and at the section with minimum diameter of the main body 10.

In embodiment variants, even provided in combination with providing a main body 10 with truncated conical shape, the base 1 can include positioning means 15 allowing an action, in case together with the one of the inner walls 10*a* of the main body 10, for centring the retaining means 14 by the aerial vehicle 2.

In particular, said positioning means 15 is configured to determine a relative position (for example a rotation with respect to the vertical axis) of the aerial vehicle 2 with respect to the main body 10 and, in the illustrated embodiment, is housed in a chamber 16 facing towards the stationing region 12.

Advantageously, the positioning means 15 comprises a control unit 15*a* configured to communicate with and modify the landing and/or take-off trajectory T of the aerial vehicle 2 as a function of a predetermined landing and/or take-off trajectory.

Said positioning means 15 can be remotely controlled, in an automatic way or manually by an operator. With reference to the example of FIG. 2, preferably the control unit 15*a* comprises a receiver and/or an emitter 15*b* of an optical and/or radio signal associable to a position parameter of the aerial vehicle. For example, the control unit 15*a* comprises a chamber which detects the aerial vehicle 2 in its field of action, designated with the sketched lines A, and through localization algorithms, such as image processing algorithms or others, it determines the relative shifting of the aerial vehicle 2 with respect to the chamber, by calculating the error with respect to a predetermined position and by communicating to the aerial vehicle 2 the corrective actions of the trajectory T during the raise towards the retaining means 14.

Preferably, the retaining means 14 is at least partially placed in said chamber 16 which, in a preferred embodiment of the base 1, is arranged in an opposed position compared to the one wherein the opening 11 of the central body 10 is arranged, preferably at the smaller base, should the latter have a truncated conical shape.

In embodiments, said chamber 16 has a shape which can be sized in a specific way to house exactly the attachment portion 21 of a selected type of aerial vehicle 2.

Said retaining means 14 preferably comprises a plier-like gripping system provided at least with an arm, preferably a couple of arms, each one designated with the reference 14*a*. In this case, according to a preferred embodiment, the retaining means 14 is associated to not illustrated returning means, configured to keep in gripping condition at least an arm 14*a* and allow a temporary opening of the gripping system during a thrust motion of the aerial vehicle 2 on the retaining means 14. In the preferred embodiment in fact, the gripping of the aerial vehicle in the base is guaranteed without the aid of electronic or controlled systems, that is the aerial vehicle is capable of hooking firmly only thanks to the thrust motion upwards during the landing phase.

The returning means can be reversible elastic elements and the arms 14*a* of the gripping system can include ends 140 with an invitation profile so as to ease the opening of the retaining means 14 only when the aerial vehicle 2 thrusts, according to a thrust direction in agreement to an inlet direction in the stationing region 12, on said ends 140.

Alternatively, or in combination to what just described, the retaining means 14 is preferably driven to open by actuation means, not visible in figures.

Figure 4:
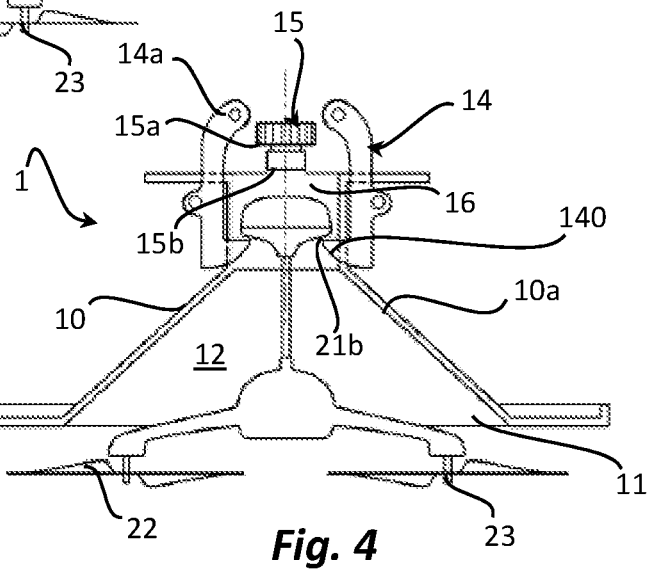
FIG. 4 shows a side section view of the base of FIG. 1 and of the aerial vehicle of FIG. 2 in a gripping condition on the aerial vehicle.
Figure 5:
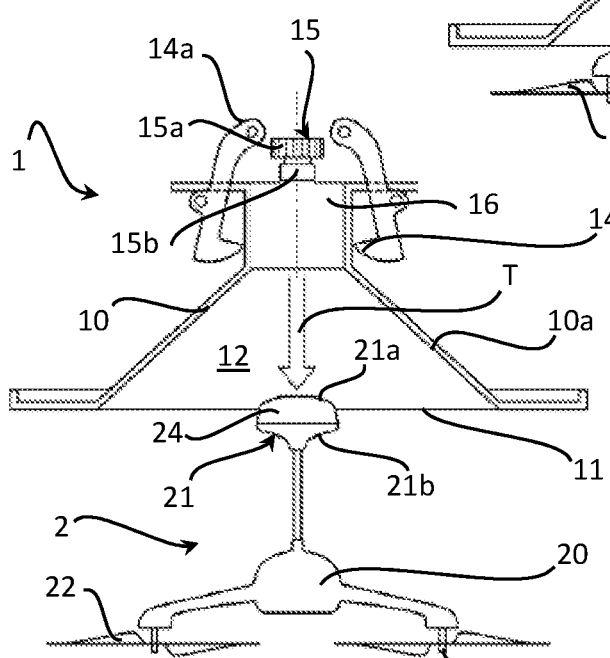
FIG. 5 shows a side section view of the base of FIG. 1 and of the aerial vehicle of FIG. 2 in a take-off condition of the aerial vehicle.

FIGS. 4 and 5, respectively, illustrate the gripping condition and the releasing condition of the retaining means 14 on the aerial vehicle 2 and it will be appreciated that the base 1 according to the present invention could allow a stable stationing of the aerial vehicle and a controlled release of the latter.

As previously mentioned, the retaining means 14 cooperates by interfering with the attachment portion 21 of the drone 2 which comprises a frame body 20 connected to rotor means 23 provided, preferably, with at least one helix 22. Advantageously the attachment portion 21 develops like a mushroom and it comprises an engagement apical element 21a, for example with a dome-like profile as illustrated in the examples, and shaped so as to form a peripheral edge 21b.

Preferably, the attachment portion 21 has an overall extension so that in gripping condition of the aerial vehicle on the base 1, the rotor means 23 results to be positioned outside the stationing region 12.

As it will be described in details hereinafter, preferably said engagement apical element 21a houses a light source inside thereof (or vice versa a device capable of detecting it), to better identify the aerial vehicle through the detecting means 15b (respectively emitters and/or receivers of a light source) associated to the control unit 15a.

Advantageously the retaining means 14 is configured to allow at least a rotation on itself of the aerial vehicle 2 in said gripping condition.

Preferably, the ends 140 of the arms of the gripping system engage the peripheral edge 21b indeed so as to allow said rotation of the aerial vehicle 2 on itself when it is in a hooked condition on the base 1. In embodiment variants, the retaining means 14 can include magnetic or pneumatic elements which cooperate with corresponding magnetic or magnetizable elements, that is pneumatic elements provided at the attachment portion 21 of the aerial vehicle 2.

In this way the base 1 guarantees further operability on the aerial vehicle 2, as mentioned previously.

In fact, it is possible, for example by providing a second opening on the (not illustrated in figures) main body, such as a door preferably obtained at the side walls of the main body 10, to access inside the stationing region 12 when the aerial vehicle 2 is hooked by the retaining means 14. As it can rotate around itself, in particular around one vertical axis of symmetry thereof, the aerial vehicle 2 then can be positioned by exposing suitably for example a defective portion or the region supplying the battery at said second opening, to allow the repairing and/or maintenance and/or replacement procedures.

Preferably, the battery is connected to the aerial vehicle 2 by means of an automatic hooking system, for example of magnetic, electric and/or mechanical type. The replacement of the battery can take place through an articulated arm placed outside the main body 10 of the base 1, which carries at one end the system for hooking to the battery itself. The articulated arm accesses the aerial vehicle 2 through said second opening, it reaches the battery of the aerial vehicle and it extracts it by bringing it outside the base 1. Subsequently, the articulated arm will insert, with a motion specular to the extraction one, a new battery by restoring the aerial vehicle 2 in order of flight.

Such procedures can be performed by an operator manually or even automatically and the base 1 can also provide even automated connecting means, which connects the battery of the aerial vehicle 2 to a recharge integrated system, to allow thereto to be ready for a new flight in the shortest period of time as possible.

The aerial vehicle comprises preferably a control module 24 configured to transmit and/or receive a signal associated to a position parameter of the aerial vehicle 2 and to modify its trajectory T according to said signal. In embodiment variants, the control module 24 comprises at least a light source, for example of the type with operating led on infrared spectrum, which cooperates with the control unit 15a of the base 1 and it is preferably at least partially arranged at the attachment portion 21 or more preferably the engagement apical element 21a.

The present invention has been so far described with reference to preferred embodiments thereof. It is to be meant that each one of the technical solutions implemented in the preferred embodiments, herein described by way of example, could advantageously be combined differently therebetween, to create other embodiments, belonging to the same inventive core and however all within the protective scope of the herebelow reported claims.

The invention claimed is:

1. A landing and take-off base for an unmanned aerial vehicle, comprising: a main body provided with an opening and comprising a continuous internal wall defining a stationing region inside said main body; a retaining unit provided with a couple of gripping arms configured to engage an attachment portion of the aerial vehicle and to allow a controlled hooking and/or release of the attachment portion, wherein said continuous internal wall has a converging truncated conical shape towards said retaining unit and wherein said opening is placed at a larger base surface, the base configured such that, in use, said retaining unit assumes a gripping condition wherein the aerial vehicle is hooked and at least partially housed inside the stationing region and a release condition wherein the aerial vehicle is released and free to fall through said opening during the take-off.

2. The landing and take-off base according to claim 1, further comprising a supporting element configured to fix said main body in a suspended position with respect to a reference plane for the manoeuvring procedures of the aerial vehicle.

3. The landing and take-off base according to claim 1, further comprising positioning unit configured to determine a relative position of the aerial vehicle with respect to said main body.

4. The landing and take-off base according to claim 3, wherein said positioning unit is housed at a chamber of the main body facing towards said stationing region.

5. The landing and take-off base according to claim 3, wherein said positioning unit comprises a control unit configured to communicate with and modify the landing and/or take-off trajectory of the aerial vehicle as a function of a predetermined landing and/or take-off trajectory.

6. The landing and take-off base according to claim 5, wherein said control unit comprises a receiver and/or emitter of an optical and/or radio signal associable to a position parameter of the aerial vehicle.

7. The landing and take-off base according to claim 1, further comprising a returning element configured to maintain in said gripping condition at least one of said couple of gripping arms and allow a temporary opening of the retaining unit during a thrust motion of the aerial vehicle on at least one of said couple of gripping arms.

8. The landing and take-off base according to claim 1, wherein said retaining unit is driven to open by an actuation component.

9. The landing and take-off base according to claim 1, wherein said retaining unit is configured to allow at least a rotation of the aerial vehicle in said gripping condition.

10. The landing and take-off base according to claim 1, wherein said main body has a second opening shaped so as to allow access to the stationing region when the aerial vehicle is inside thereof.

11. An unmanned aerial vehicle, suitable to cooperate with a landing and/or take-off base of the aerial vehicle according to claim 1, comprising a frame body connected to a rotor unit provided with at least one helix, wherein from said frame body projects an attachment portion comprising an engagement apical element shaped to interfere with a continuous inner wall of said base by implementing a self-centring of the engagement apical element with respect to the retaining unit during an approaching motion of the aerial vehicle to the retaining unit, and wherein the attachment portion has an extension so that, in the gripping condition of the aerial vehicle on the base, said rotor unit is positioned outside the stationing region.

12. The unmanned aerial vehicle according to claim 11, comprising a control module configured to transmit and/or receive a signal associated to a position parameter of the aerial vehicle and to modify the trajectory of the aerial vehicle according to said signal.

13. The unmanned aerial vehicle according to claim 11, wherein said apical element is shaped so as to form a peripheral edge so as to allow rotation of the aerial vehicle when the aerial vehicle is in a hooked condition on the base.

14. The unmanned aerial vehicle according to claim 12, wherein said control module is at least partially arranged at said apical portion.

15. The unmanned aerial vehicle according to claim 11, comprising a supply component replaceable from outside of said frame body.

16. A kit comprising a landing and take-off base and an unmanned aerial vehicle according to claim 11.

* * * * *